(12) United States Patent
Son et al.

(10) Patent No.: US 10,274,786 B2
(45) Date of Patent: Apr. 30, 2019

(54) LIQUID CRYSTAL DISPLAY DEVICE AND MANUFACTURING METHOD THEREOF

(71) Applicant: SAMSUNG DISPLAY CO., LTD., Yongin-si, Gyeonggi-do (KR)

(72) Inventors: Jong Ho Son, Seoul (KR); Sun Young Kwon, Seoul (KR); Tae Hoon Kim, Suwon-si (KR); Kyung Hae Park, Seongnam-si (KR); Joon Hyung Park, Seoul (KR); Ji Hong Bae, Yongin-si (KR); Gak Seok Lee, Hwaseong-si (KR); Jin Hyeong Lee, Hwaseong-si (KR); Chang Hun Lee, Hwaseong-si (KR); Ji Eun Jang, Suwon-si (KR); Hye Lim Jang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 114 days.

(21) Appl. No.: 15/484,340

(22) Filed: Apr. 11, 2017

(65) Prior Publication Data
US 2017/0357130 A1 Dec. 14, 2017

(30) Foreign Application Priority Data
Jun. 9, 2016 (KR) ........................ 10-2016-0071433

(51) Int. Cl.
*G02F 1/133* (2006.01)
*G02F 1/1337* (2006.01)
(Continued)

(52) U.S. Cl.
CPC ...... *G02F 1/133753* (2013.01); *G02F 1/1341* (2013.01); *G02F 1/133707* (2013.01);
(Continued)

(58) Field of Classification Search
CPC .................. G02F 1/133753; G02F 1/133707
See application file for complete search history.

(56) References Cited

U.S. PATENT DOCUMENTS

| 5,853,822 A * | 12/1998 | Lyu | G02F 1/133711 |
| | | | 428/1.2 |
| 8,432,521 B2 * | 4/2013 | Jang | G02F 1/133703 |
| | | | 349/123 |

(Continued)

FOREIGN PATENT DOCUMENTS

| KR | 1020130091212 A | 8/2013 |
| WO | 2013094957 A1 | 6/2013 |

OTHER PUBLICATIONS

Abraham Ulman, "Formation and Structure of Self-Assembled Monolayers", Chem. Rev., 1996, v. 96, pp. 1533-1554.
(Continued)

*Primary Examiner* — James A Dudek
(74) *Attorney, Agent, or Firm* — Cantor Colburn LLP

(57) ABSTRACT

A liquid crystal display device comprises: a first substrate; an organic layer disposed on the first substrate; a pixel electrode disposed on the organic layer; a plurality of slits defined in the pixel electrode and configured to exposed a surface of the organic layer; a liquid crystal alignment film disposed on a surface of the pixel electrode and on the surface of the organic layer exposed by the plurality of slits; and a plurality of liquid crystal molecules disposed on the liquid crystal alignment film, wherein the liquid crystal alignment film includes a first region overlapping the plurality of slits and a second region overlapping the pixel electrode, wherein the second region has a surface energy different from a surface energy of the first region.

14 Claims, 13 Drawing Sheets

(51) Int. Cl.
*G02F 1/1341* (2006.01)
*G02F 1/1343* (2006.01)
*G02F 1/1362* (2006.01)

(52) U.S. Cl.
CPC .. *G02F 1/134327* (2013.01); *G02F 1/136286* (2013.01); *G02F 2001/133757* (2013.01); *G02F 2001/136295* (2013.01); *G02F 2201/123* (2013.01); *G02F 2202/02* (2013.01)

(56) References Cited

U.S. PATENT DOCUMENTS

| | | | | |
|---|---|---|---|---|
| 2003/0112394 | A1* | 6/2003 | Yoshida | G02F 1/133753 349/123 |
| 2005/0078249 | A1* | 4/2005 | Fan | G02F 1/133753 349/126 |
| 2007/0040973 | A1* | 2/2007 | Lee | G02F 1/133753 349/124 |
| 2007/0048178 | A1* | 3/2007 | Gu | B82Y 30/00 422/504 |
| 2009/0109386 | A1* | 4/2009 | Chen | G02F 1/133707 349/123 |
| 2009/0279032 | A1* | 11/2009 | Kwok | G02F 1/133753 349/124 |
| 2011/0310337 | A1* | 12/2011 | Ishihara | G02F 1/134363 349/123 |
| 2012/0086660 | A1* | 4/2012 | Moran | G09F 9/30 345/173 |
| 2012/0099065 | A1* | 4/2012 | Jang | G02F 1/133703 349/132 |
| 2012/0242941 | A1 | 9/2012 | Suwa et al. | |
| 2013/0077038 | A1* | 3/2013 | Rho | B82Y 20/00 349/144 |
| 2013/0155360 | A1 | 6/2013 | Shibahara et al. | |
| 2013/0292650 | A1* | 11/2013 | Jung | H01L 51/0004 257/40 |
| 2014/0184963 | A1* | 7/2014 | Kim | G02F 1/133719 349/33 |
| 2014/0285760 | A1* | 9/2014 | Song | G02F 1/133711 349/124 |
| 2015/0022750 | A1 | 1/2015 | Ogawa et al. | |
| 2015/0029451 | A1 | 1/2015 | Ogawa et al. | |
| 2016/0070136 | A1* | 3/2016 | Jang | G02F 1/133514 349/61 |
| 2016/0132144 | A1* | 5/2016 | Long | G06F 3/044 345/174 |
| 2017/0139279 | A1* | 5/2017 | Suwa | G02F 1/133753 |
| 2017/0205667 | A1* | 7/2017 | Suh | G02F 1/133512 |
| 2017/0261783 | A1* | 9/2017 | Sato | G02F 1/1337 |
| 2017/0357130 | A1* | 12/2017 | Son | G02F 1/133753 |
| 2018/0143485 | A1* | 5/2018 | Oh | G02B 27/0172 |

OTHER PUBLICATIONS

Bae-woon Lee, et al., "Alignment of Liquid Crystals with Patterned Isotropic Surfaces", Science, v. 291, pp. 2576-2580.
Schreiber, F, "Structure and growth of self-assembling monolayers", Progress in Surface Science, 65 (2000), pp. 151-256.
Peters, R.A., et al., "Using Self-Assembled Monolayers Exposed to X-rays to control the Wetting Behavior of Thin Films of Diblock Copolymers", Langmuir 2000, 16, 4625-4631.
Kakiuchi, T., et al., "Phase Separation of Alkanethiol Self-Assembled Monolayers during the Replacement of Adsorbed Thiolates on Au(111) with Thiols in Solution", Langmuir, 2000, 16, 7238-7244.
Kia, Y., et al., "Soft Lithography", Agnew. Chem. Int. Ed., 1998, 37, 550-575.

* cited by examiner

LIQUID CRYSTAL DISPLAY DEVICE AND MANUFACTURING METHOD THEREOF

This application claims priority to Korean Patent Application No. 10-2016-0071433 filed on Jun. 9, 2016 in the Korean Intellectual Property Office, and all the benefits accruing therefrom under 35 U.S.C. § 119, the content of which in its entirety is herein incorporated by reference.

BACKGROUND

1. Technical Field

The present invention relates to a liquid crystal display device and a manufacturing method thereof.

2. Description of the Related Art

A liquid crystal display device is a widely used flat panel display device, which includes substrates in which field generating electrodes such as a pixel electrode and a common electrode are formed, and a liquid crystal layer interposed between the substrates. The liquid crystal display device generates an electric field in the liquid crystal layer by applying a voltage to the field generating electrodes. An image is displayed in the liquid crystal display device by adjusting the alignment of the liquid crystal molecules in the liquid crystal layer and controlling the polarization of incident light.

As a method for setting an initial alignment (a pretilt angle) of liquid crystal molecules in a state where no electric field is generated, a photo alignment method may be used. The photo alignment method is a method of aligning liquid crystal molecules in a liquid crystal layer by injecting a reactive mesogen into the liquid crystal layer and curing the liquid crystal molecules through ultraviolet light exposure. However, in the photo alignment method, ionic impurities may be formed due to the use of ultraviolet light, and may reduce a reliability margin, and the like, of the liquid crystal display.

SUMMARY

Aspects of the present invention provide a liquid crystal display device capable of effectively aligning liquid crystal molecules without a separate alignment process and a manufacturing method thereof.

According to an exemplary embodiment a liquid crystal display device includes: a first substrate; an organic layer disposed on the first substrate; a pixel electrode disposed on the organic layer; a plurality of slits defined in the pixel electrode and configured to expose a surface of the organic layer; a liquid crystal alignment film disposed on a surface of the pixel electrode and on the surface of the organic layer exposed by the plurality of slits; and a plurality of liquid crystal molecules disposed on the liquid crystal alignment film, wherein the liquid crystal alignment film includes a first region overlapping the plurality of slits and a second region overlapping the pixel electrode, and wherein the second region has a surface energy different from a surface energy of the first region.

In an exemplary embodiment, a portion of the liquid crystal molecules are disposed on the first region and a portion of the liquid crystal molecules are disposed on the second region, wherein an average alignment direction of the portion of the liquid crystal molecules on the first region and an average alignment direction of the portion of the liquid crystal molecules on the second region may be formed at different angles with respect to a surface of the liquid crystal alignment film.

In an exemplary embodiment, a portion of the liquid crystal molecules are disposed on the first region, and an alignment direction of the portion of the liquid crystal molecules on the first region is perpendicular to a surface of the liquid crystal alignment film.

In an exemplary embodiment, the liquid crystal alignment film includes a self-assembled monolayer.

In an exemplary embodiment, a portion of the liquid crystal molecules includes a first alignment angle and a portion of the liquid crystal molecules includes a second alignment angle having a same angle with respect to the surface of the liquid crystal alignment film as the first alignment angle, wherein an angle of 180 degrees with respect to a plane of the liquid crystal alignment film is present between the first alignment angle and the second alignment angle.

In an exemplary embodiment, the portion of the liquid crystal molecules having the first alignment angle and the portion of the liquid crystal molecules having the second alignment angle are each located on the second region.

In an exemplary embodiment, the pixel electrode includes two or more domains, and each domain includes a different slit pattern.

In an exemplary embodiment, an average alignment direction of the liquid crystal molecules located on the second region is different for each of the two or more domains.

According to another exemplary embodiment, a liquid crystal display device includes: a first substrate; an organic layer disposed on the first substrate; a pixel electrode disposed on a portion of the organic layer; a self-assembled monolayer disposed on the pixel electrode and on a portion of the organic layer on which the pixel electrode is not disposed; and a plurality of liquid crystal molecules disposed on the self-assembled monolayer, wherein the self-assembled monolayer includes a first region overlapping the portion of the organic layer on which the pixel electrode is not disposed and a second region overlapping the pixel electrode and having a density which is different from a density of the first region.

In an exemplary embodiment, the self-assembled monolayer includes an octadecyltrichlorosilane (OTS) derivative.

In an exemplary embodiment, a portion of the liquid crystal molecules are disposed on the first region and a portion of the liquid crystal molecules are disposed on the second region, and an average alignment direction of the portion of the liquid crystal molecules on the first region and an average alignment direction of the portion of the liquid crystal molecules on the second region are at different angles with respect to a surface of the self-assembled monolayer.

In an exemplary embodiment, a portion of the liquid crystal molecules are disposed on the first region, and an alignment direction of the liquid crystal molecules on the first region is perpendicular to a surface of the self-assembled monolayer.

In an exemplary embodiment, a portion the liquid crystal molecules includes a first alignment angle and a portion of the liquid crystal molecules includes a second alignment angle having a same angle with respect to a surface of the self-assembled monolayer as the first alignment angle, wherein an angle of 180 degrees with respect to a plane of the self-assembled monolayer is present between the first alignment angle and the second alignment angle.

In an exemplary embodiment, the portion of the liquid crystal molecules having the first alignment angle and the portion of the liquid crystal molecules having the second alignment are each located on the second region.

According to an exemplary embodiment, a method of manufacturing a liquid crystal display device, comprises: forming a plurality of gate lines and a plurality of data lines on a first substrate such that a plurality of pixels are defined on the first substrate; forming an organic layer on the plurality of data lines and the plurality of gate lines; forming a metal layer on the organic layer; etching a portion of the metal layer to form a plurality of slits in the metal layer, the plurality of slits exposing a surface of the organic layer; coating a self-assembly precursor material on a surface of the metal layer and on the surface of the organic layer exposed by the plurality of slits; forming a self-assembled monolayer formed by reacting the self-assembly precursor material, and adjusting a density of the self-assembled monolayer; removing the self-assembly precursor material which did not react during the forming of the self-assembled monolayer; and forming a liquid crystal layer on the self-assembled monolayer by injecting liquid crystal molecules.

In an exemplary embodiment, the self-assembly precursor material includes octadecyltrichlorosilane (OTS).

In an exemplary embodiment, the liquid crystal alignment is controlled by performing adjustment such that an alignment direction of liquid crystal molecules on the self-assembled monolayer overlapping the slits is different from an alignment direction of liquid crystal molecules on the self-assembled monolayer overlapping the metal layer.

In an exemplary embodiment, adjusting of the density of the self-assembled monolayer includes controlling a reaction time of the self-assembly precursor material.

In an exemplary embodiment, wherein an alignment direction of the liquid crystal molecules on the self-assembled monolayer and overlapping the slits is perpendicular to a surface of the self-assembled monolayer.

In an exemplary embodiment, two or more domains are formed in each pixel of the plurality of pixels, and wherein each domain comprises a different slit pattern.

Embodiments of the present invention provide at least the following effects.

In a liquid crystal display device, an initial alignment of liquid crystal molecules can be effectively set without a separate alignment process.

The effects of the present invention are not limited to the above-described effects and other effects which are not described herein will become apparent to those skilled in the art from the following description. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
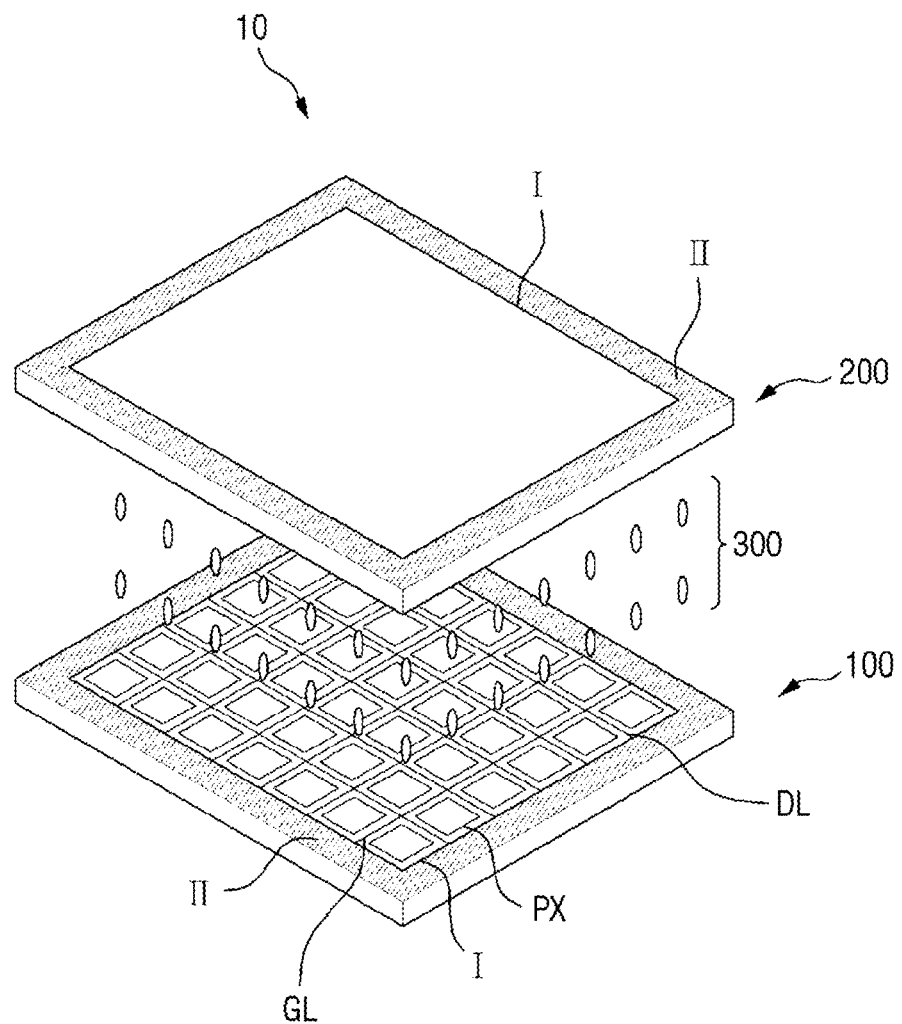
FIG. 1 is a schematic exploded perspective view of a liquid crystal display device according to an embodiment.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present invention will be described with reference to the accompanying drawings.

Figure 2:
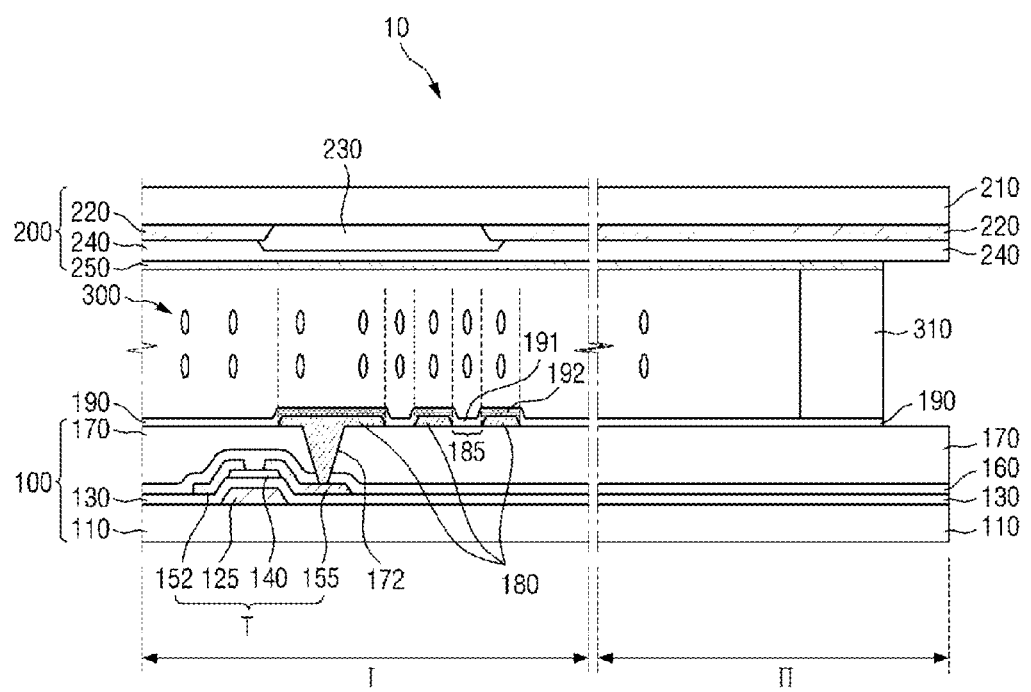
FIG. 2 is a schematic cross-sectional view of the liquid crystal display device shown in FIG. 1.

FIG. 1 is a schematic exploded perspective view of a liquid crystal display device 10 according to an embodiment. FIG. 2 is a schematic cross-sectional view of the liquid crystal display device 10 shown in FIG. 1.

Referring to FIG. 1, the liquid crystal display device 10 includes a first display substrate 100, a second display substrate 200 spaced apart from the first display substrate 100 to face the first display substrate 100 while maintaining a predetermined cell gap, and a liquid crystal layer 300 interposed between the first display substrate 100 and the second display substrate 200.

Each of the first display substrate 100 and the second display substrate 200 may include a display area I and a non-display area II. The display area I is an area where an image is viewed. The non-display area II is formed in the periphery of the display area I so as to surround the display area I, and may be an area where an image is not viewed.

In the display area I of the first display substrate 100, a plurality of gate lines GL extending in one direction and a plurality of data lines DL extending in a direction perpendicular to the one direction may be formed.

In the display area I of the first display substrate 100, a plurality of pixels PX arranged in a matrix form may be defined by the gate lines GL and the data lines DL, and a pixel electrode 180 (see FIG. 2) may be arranged for each pixel PX.

A different pattern may be formed for each domain in the pixel electrode 180 such that two or more domains can be defined in each pixel PX. A detailed description thereof will be given later.

In the non-display area II of the first display substrate 100, a driving unit (not shown) may be disposed to provide a gate driving signal, a data driving signal, and the like, to each pixel PX of the display area I.

The liquid crystal layer 300 may include a liquid crystal composition including liquid crystal molecules. The liquid crystal composition may include liquid crystal molecules with negative dielectric anisotropy.

Referring to FIG. 2, the first display substrate 100 may include a first substrate 110, a gate line GL, a gate electrode 125, a gate insulating layer 130, a semiconductor layer 140, a data line DL, a source electrode 152, a drain electrode 155, an organic layer 170, the pixel electrode 180, and a liquid crystal alignment film 190.

The first substrate 110 is a base substrate of the first display substrate 100. The first substrate 110 may include the display area I and the non-display area II. The first substrate 110 may be a transparent insulating substrate containing glass or plastic.

On the first substrate 110 of the display area I, the gate line GL and the gate electrode 125 branched inward from the gate line GL, may be arranged in each pixel PX. The gate line GL may extend to the non-display area II, and may be connected to a gate pad (not shown) in the non-display area II. The gate line GL and the gate electrode 125 may be formed of a conductive metal including aluminum, molybdenum, copper, an alloy thereof, or a combination thereof.

The gate insulating layer 130 may be disposed on the first substrate 110 to cover the gate line GL and the gate electrode 125. The gate insulating layer 130 may also be formed on the non-display area II. The gate insulating layer 130 may be formed of an insulating layer including silicon nitride, silicon oxide, silicon oxynitride, or a combination thereof.

The semiconductor layer 140 may be disposed on the gate insulating layer 130 of the display area I. The semiconductor layer 140 may be disposed to overlap the gate electrode 125. The semiconductor layer 140 may be formed of a semiconductor material including amorphous silicon, polycrystalline silicon, or the like, but it is not limited thereto. In another embodiment, the semiconductor layer 140 may be formed of a semiconductor including an oxide such as zinc, indium, gallium, hafnium, or a combination thereof.

The data line DL, the source electrode 152 branched inward from the data line DL in each pixel PX, and the drain electrode 155 spaced apart from the source electrode 152 may be disposed on the semiconductor layer 140. The data line DL may extend to the non-display area II, and may be connected to a data pad (not shown) in the non-display area II. The data line DL, the source electrode 152 and the drain electrode 155 may be formed of conductive metal containing aluminum, molybdenum, chromium, tantalum, titanium, other refractory metal, an alloy thereof, or a combination thereof.

A passivation film 160 may be disposed on the source electrode 152 and the drain electrode 155. The passivation film 160 may be formed of an insulating material including a silicon nitride film, a silicon oxide film, a silicon oxynitride film, or the like.

An organic layer 170 may be disposed on the passivation film 160. The organic layer 170 may serve to planarize the upper surface of the first substrate 110. In some embodiments, the organic layer 170 may be formed of an organic insulating material.

In some other embodiments, the organic layer 170 may be omitted. Hereinafter, for convenience of explanation, a case where the organic layer 170 is present will be described as an example.

A contact hole 172 may be formed in the passivation film 160 and the organic layer 170 to electrically connect the drain electrode 155 and the pixel electrode 180 with each other.

The pixel electrode 180 may be disposed on the organic layer 170 for each pixel PX defined by the gate line GL and the data line DL. Each pixel electrode 180 may be electrically connected to the drain electrode 155 through the contact hole 172.

In each pixel PX, two or more domains defined by the pattern of the pixel electrode 180 may be formed. The pattern of the pixel electrode 180 may be a slit pattern or a projection pattern. The slit pattern is a pattern formed by a space (e.g., slits) in which the pixel electrode 180 is not present, and the projection pattern is a pattern formed by a portion (projections) protruding upward from the pixel electrode 180. In an exemplary diagram, the pixel electrode 180 having a slit pattern is illustrated.

The pixel electrode 180 may be formed of a transparent conductive material such as indium tin oxide (ITO), indium zinc oxide (IZO), zinc oxide (ZO), or a combination thereof.

The gate electrode 125, the semiconductor layer 140, the source electrode 152, and the drain electrode 155 of the first display substrate 100 may constitute a thin film transistor T which is a switching element. The gate electrode 125, which is a control terminal of the thin film transistor T, is connected to the gate line GL, the source electrode 152, which is an input terminal of the thin film transistor T, is connected to the data line DL, and the drain electrode 155, which is an output terminal of the thin film transistor T, may be electrically connected to the pixel electrode 180 through the contact hole 172.

The pixel electrode 180 may receive a data voltage through the thin film transistor T. The pixel electrode 180 may generate an electric field in cooperation with a common electrode 250 to control the alignment direction of the liquid crystal molecules in the liquid crystal layer 300 disposed therebetween.

The liquid crystal alignment film 190 may be disposed on the pixel electrode 180. The liquid crystal layer 300 including the liquid crystal composition may be disposed on the liquid crystal alignment film 190.

When the pixel electrode 180 has a slit pattern, the liquid crystal alignment film 190 may include a first region 191 formed on slits 185 to overlap the slits 185 and a second region 192 formed on the pixel electrode 180 to overlap a main body of the pixel electrode 180. The first region 191 of the liquid crystal alignment film 190 may cover the surface of the organic layer 170, and the second region 192 of the liquid crystal alignment film 190 may cover the surface of the pixel electrode 180.

The first region 191 and the second region 192 may have different surface energy values. The liquid crystal tends to vary in alignment degree and speed depending on the least amount of surface energy present in an alignment process. Therefore, if a liquid crystal alignment process is performed such that the alignment process is stopped when the liquid crystal molecules have different orientations on the first region 191 and the second region 192, the liquid crystal molecules may be fixed so that they have different initial orientation angles in a space on the first region 191 and a space on the second region 192. A detailed description thereof will be given later.

The liquid crystal alignment film 190 may include a self-assembled monolayer (SAM). The self-assembled monolayer may be made of a first self-assembly precursor material represented by Formula 1, a second self-assembly precursor material represented by Formula 2, or a mixture thereof.

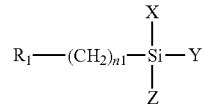

Formula 1

Formula 2

In Formulas 1 and 2, each of $R_1$ and $R_2$ is independently an alkyl group, a vinyl group, an acrylate, or a methacrylate, each of $n_1$ and $n_2$ are independently 1 to 30, and each of X, Y, and Z are independently Cl, $-OCH_3$, or $-OC_2H_5$.

As an example of the first and second self-assembly precursor materials, includes octadecyltrichlorosilane (OTS), octadecyltrimethoxysilane (OTMS), a derivative thereof, or a combination thereof, may be mentioned.

In one exemplary embodiment for adjusting the surface energy of the first region 191 and the second region 192, the concentration of the self-assembled monolayer included in the first region 191 may be configured differently from the concentration of the self-assembled monolayer included in the second region 192. In this case, since the densities of the self-assembled monolayers included in the first and second regions 191 and 192, or the densities of the first and second regions 191 and 192 themselves are different from each other, the surface energies of the first region 191 and the second region 192 may be different from each other. A detailed description thereof will be given later.

The second display substrate 200 may include a second substrate 210, a light blocking layer 220, a color filter layer 230, an overcoat layer 240, and a common electrode 250.

The second substrate 210 is a base substrate of the second display substrate 200. The second substrate 210 may include the display area I and the non-display area II. The second substrate 210 may be a transparent insulating substrate containing glass or plastic.

The light blocking layer 220 and the color filter layer 230 may be disposed on one surface of the second substrate 210 facing the first display substrate 100. The light blocking layer 220 is also referred to as a black matrix. The color filter layer 230 may be disposed in a region corresponding to each pixel PX in the display area I. The light blocking layer 220 may be disposed in a portion where the color filter layer 230 is not formed, and may be disposed to overlap a portion of the color filter layer 230. The light blocking layer 220 may be disposed on the second substrate 210 of the non-display area II.

The overcoat layer 240 may be disposed on the light blocking layer 220 and the color filter layer 230. The overcoat layer 240 may relieve a step difference between the light blocking layer 220 and the color filter layer 230 and may planarize the upper side of one surface of the second substrate 210. The overcoat layer 240 may include an organic insulating material. In some cases, the overcoat layer 240 may be omitted.

The common electrode 250 may be disposed on the overcoat layer 240. The common electrode 250 may be an integrated electrode arranged over all of the pixels PX. The common electrode 250 may be a patternless electrode having no pattern, but is not limited thereto. The common electrode 250 may be formed of a transparent conductive material such as indium tin oxide (ITO), indium zinc oxide (IZO), zinc oxide (ZO), or a combination thereof.

The liquid crystal display device 10 may further include a backlight unit (not shown) disposed below the first display substrate 100, and may further include a polarizer plate (not shown) disposed below the first display substrate 100 and above the second display substrate 200.

The first display substrate 100 and the second display substrate 200 may be bonded together by a sealing member 310 including a sealant or the like.

Unlike the first display substrate 100, the second display substrate 200 may not include a liquid crystal alignment film. In this case, the liquid crystal alignment film 190 of the first display substrate 100 and the common electrode 250 of the second display substrate 200 face each other with the liquid crystal layer 300 interposed therebetween.

Figure 3:
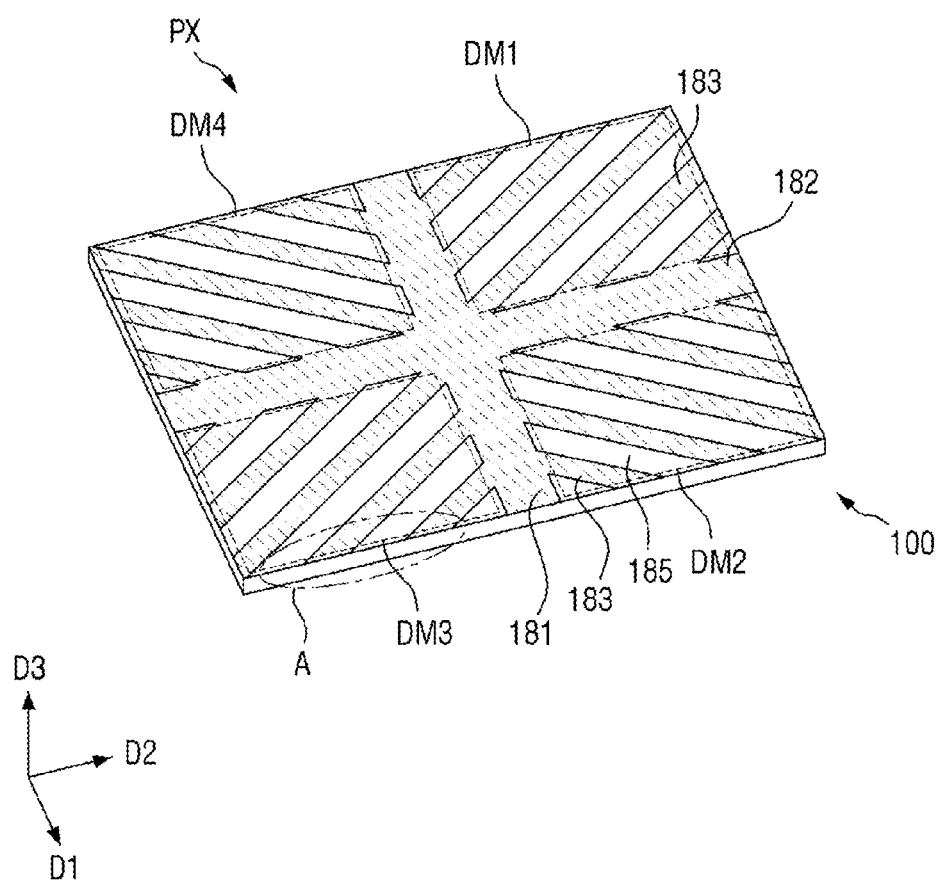
FIG. 3 is a schematic perspective view of one pixel (PX) of the liquid crystal display device of FIG. 1.
Figure 4:
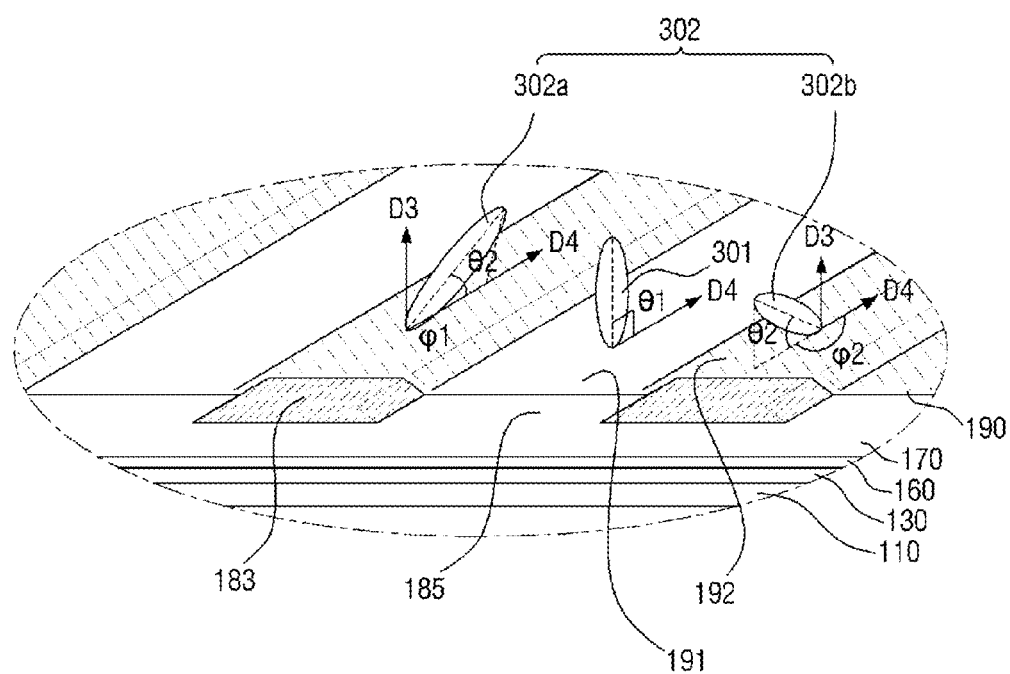
FIG. 4 is an enlarged view of the circled portion A of FIG. 3.

FIG. 3 is a schematic perspective view of one pixel (PX) of the liquid crystal display device of FIG. 1. FIG. 4 is an enlarged view of the circled portion A of FIG. 3.

In each pixel PX, the pixel electrode 180 having a pattern defining two or more domains may be disposed. Although FIG. 3 shows a pixel PX having a slit pattern defining four different domains, the present invention is not limited thereto.

Referring to FIG. 3, the pixel electrode 180 may include a first stem electrode 181 extending in a first direction D1, a second stem electrode 182 extending in a second direction D2 perpendicular to the first direction D1 to intersect the first stem electrode 181, and a plurality of branch electrodes 183 extending from the first stem electrode 181 and the second stem electrode 182 in a diagonal direction with respect to the first direction D1 and the second direction D2.

In the pixel electrode 180, four domains separated by the first stem electrode 181 and the second stem electrode 182, may be defined. The branch electrodes 183 may extend in a different direction for each domain. In FIG. 3, it is illustrated that the branch electrodes 183 located in the first and third domains DM1 and DM3 and the branch electrodes 183 located in the second and fourth domains DM2 and DM4 extend in different directions. The slits 185 are disposed between the neighboring branch electrodes 183. The slits 185 are spaces in which a material of the pixel electrode 180 is not present in the pixel PX and are at least partially defined by the stem electrodes 181 and 182 and/or the branch electrodes 183.

FIG. 4 illustrates the liquid crystal molecules 301 and 302 located on the liquid crystal alignment film 190 in one domain DM3 of FIG. 3, in which no electric field is generated. The liquid crystal alignment film 190 may be formed to cover the surface of the organic layer 170 exposed by the pixel electrode 180 and the slits 185. The liquid crystal molecules 301 and 302 may be located on the first region 191 and the second region 192 of the liquid crystal alignment film 190.

The angle between the director of the liquid crystal molecule and the surface of the liquid crystal alignment film 190 is referred to as a pretilt angle. The angle between a component of the director of the liquid crystal molecule along the surface of the liquid crystal alignment film 190 and a fourth direction D4 in which the branch electrodes 183 extend is referred to as an azimuthal angle.

The first region 191 and the second region 192 may have different surface energy values. The liquid crystal has a tendency that the pretilt angle varies depending on the least amount of surface energy in the alignment process. Therefore, by performing the liquid crystal alignment process such that the alignment process is stopped when the liquid crystal molecule 301 on the first region 191 has a pretilt angle θ1 of 90 degrees and the liquid crystal molecule 302 on the second region 192 has a pretilt angle θ2 between 80 degrees and 90 degrees, the initial alignment of the liquid crystal can be controlled. In FIG. 4, it is illustrated that the liquid crystal molecule 301 on the first region 191 is aligned to have the pretilt angle θ1 of 90 degrees and the liquid crystal molecule 302 on the second region 192 is aligned to have the pretilt angle θ2 of about 85 degrees.

The liquid crystal molecule 302 on the second region 192 may have a constant azimuthal angle φ1 (φ2) regardless of the surface energy value. Specifically, the liquid crystal molecule 302 on the second region 192 may be aligned to be inclined only in the fourth direction D4 in which the branch electrodes 183 extend. In particular, as shown in FIG. 4, there may be a liquid crystal molecule 302a having an azimuthal angle φ1 of 0 degrees and a liquid crystal molecule 302b having an azimuthal angle φ2 of 180 degrees.

When an electric field is formed at least once after bonding the first display substrate 100 and the second display substrate 200 with the liquid crystal layer 300 interposed therebetween, two types of the liquid crystal molecules 302a and 302b are tilted in the same direction on the second region 192 in one domain, and the liquid crystal molecules can maintain the same orientation even after the electric field is removed thereafter.

Hereinafter, the principle that the azimuthal angle of the liquid crystal molecule is determined regardless of the surface energy value will be described.

Figure 5A:
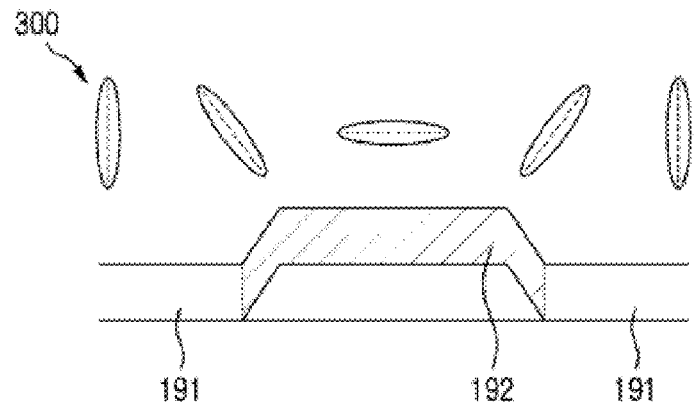
FIGS. 5A to 5C schematically show the alignment principle of liquid crystal molecules.
Figure 5B:
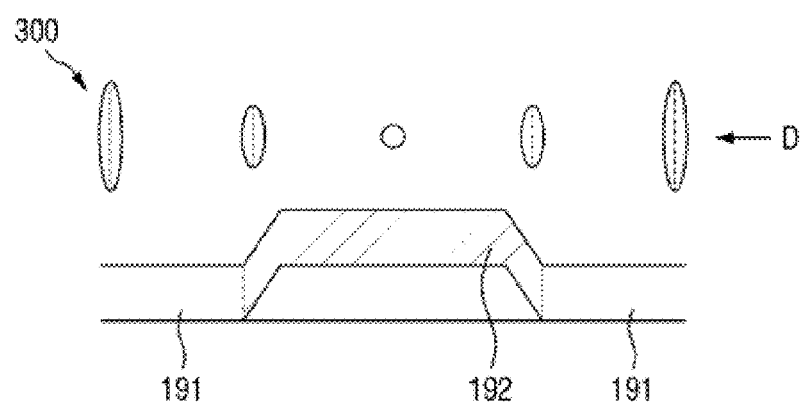
Figure 5C:
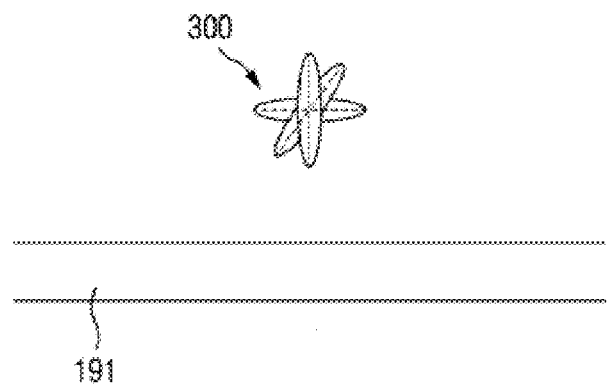

FIGS. 5A to 5C schematically shows the alignment principle of liquid crystal molecules.

FIG. 5A illustrates that the liquid crystal molecules on the first region 191 and the second region 192 among the plurality of liquid crystal molecules included in the liquid crystal layer 300 have bond deformation, FIG. 5B illustrates that the liquid crystal molecules on the first region 191 and the second region 192 among the plurality of liquid crystal molecules included in the liquid crystal layer 300 have twist deformation, and FIG. 5C illustrates the plurality of liquid crystal molecules of FIG. 5B viewed in a lateral direction D.

Since the bond deformation energy is greater than the twist deformation energy, the liquid crystal molecules can take an orientation in a twist deformation state as shown in FIG. 5B. Accordingly, the azimuthal angle of the liquid crystal molecules may have a specific value regardless of the surface energy of the first region 191 and the second region 192 unlike the pretilt angle.

Figure 6:
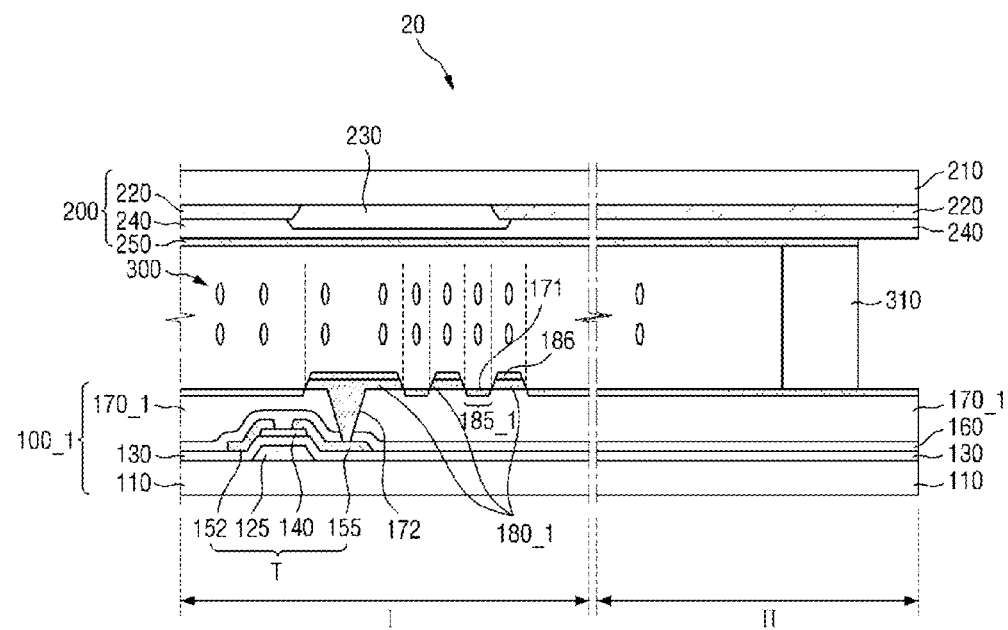
FIG. 6 is a schematic cross-sectional view of a liquid crystal display device according to another embodiment.

FIG. 6 is a schematic cross-sectional view of a liquid crystal display device 20 according to another embodiment.

The liquid crystal display device 20 is different from the liquid crystal display device 10 of FIG. 2 in that a separate liquid crystal alignment film is not formed and a pixel electrode 180_1 and an organic layer 170_1 include ultraviolet (UV) light-treated surfaces 171 and 186. The other configurations are the same as those described with reference to FIGS. 1 and 2. The following description mainly focuses on the differences between FIG. 6 and FIG. 2, and redundant descriptions will be omitted.

Referring to FIG. 6, by treating the surface of the pixel electrode 180_1 and the surface of the organic layer 170_1 exposed by slits 185_1 with ultraviolet light, the surface energy of the surface adjacent to the liquid crystal layer can be obtained differently without a separate liquid crystal alignment film.

In order to make the surface energy of the pixel electrode 180_1 different from the surface energy of the organic layer 170_1 exposed by the slits 185_1, the exposure time to ultraviolet light may be adjusted, or an exposure mask (not shown) having the same pattern as the pattern of the pixel electrode 180_1 may be used. However, the present invention is not limited thereto, and the surface may be treated using a physical and/or chemical method other than ultraviolet light treatment.

Figure 7:
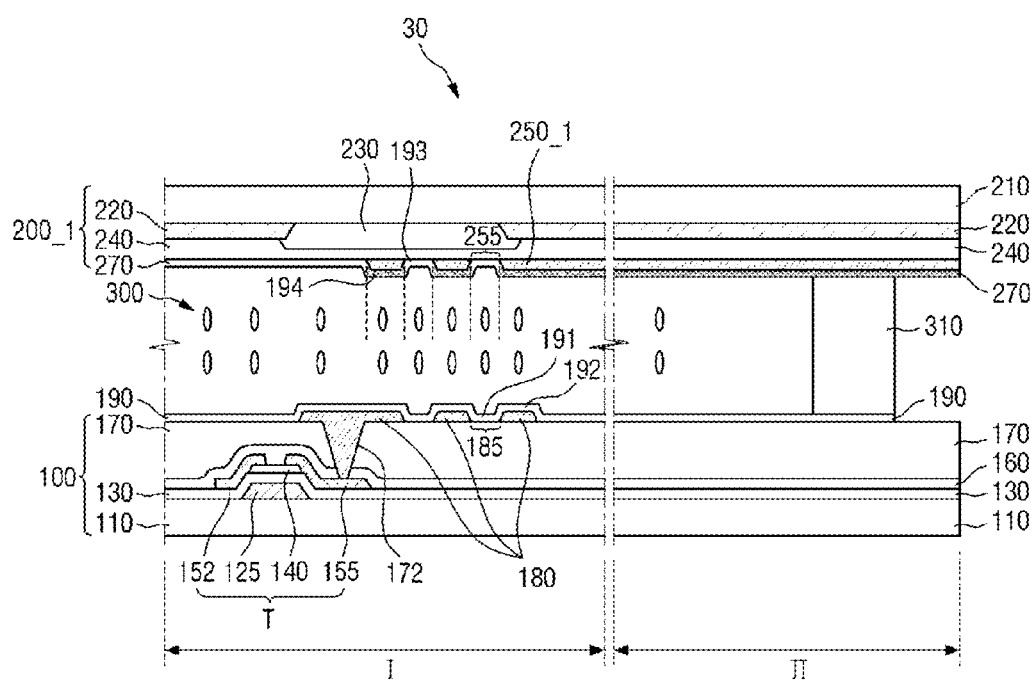
FIG. 7 is a schematic cross-sectional view of a liquid crystal display device according to still another embodiment.

FIG. 7 is a schematic cross-sectional view of a liquid crystal display device 30 according to still another embodiment of the present invention.

The liquid crystal display device 30 of FIG. 7 is different from the liquid crystal display device 10 of FIG. 2 in that a common electrode 250_1 on the second display substrate 200_1, also has a slit pattern and the liquid crystal display device 30 further includes an upper liquid crystal alignment film 270 formed on the common electrode 250_1. The other configurations are the same as those described with reference to FIGS. 1 and 2. The following description mainly focuses on the differences in FIG. 7, and a redundant description will be omitted.

Referring to FIG. 7, the upper liquid crystal alignment film 270 may include a third region 193 overlapping slits 255 and a fourth region 194 overlapping the common electrode 250_1. The third region 193 may be formed to cover the surface of the overcoat layer 240, and the fourth region 194 may be formed to cover the surface of the common electrode 250_1.

In this case, the surface energy of the third region 193 may be different from the surface energy of the fourth region 194. Thus, it is also possible to control the alignment of the liquid crystal molecules located adjacent to a second display substrate 200_1. The structure of the liquid crystal display device 30 can be utilized to manufacture a curved display device that controls the alignment of both the liquid crystal molecules located on the pixel electrode side of the liquid crystal layer and the liquid crystal molecules located on the common electrode side of the liquid crystal layer.

Hereinafter, a method of manufacturing a liquid crystal display device according to one embodiment of the present invention will be described.

Figure 8:
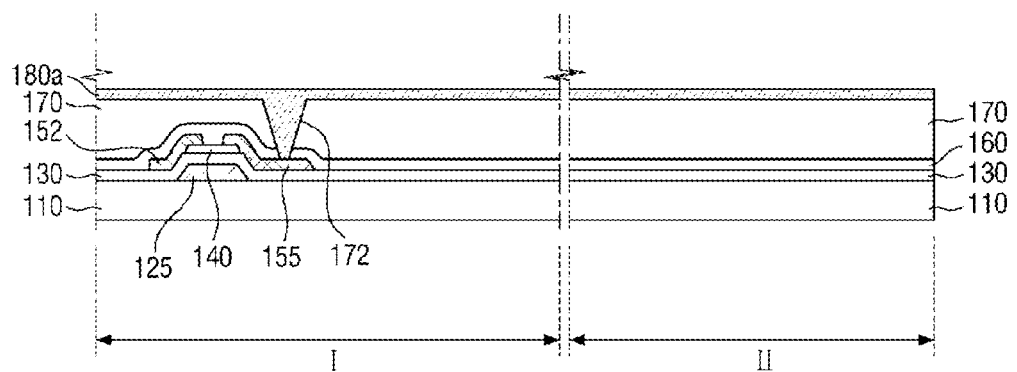
FIGS. 8 to 10 are cross-sectional views illustrating a process of manufacturing a liquid crystal display device according to one embodiment.
Figure 9:
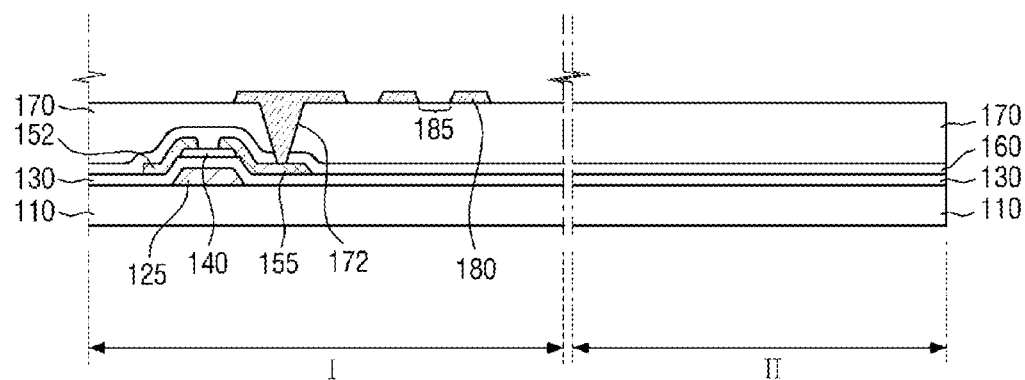
Figure 10:
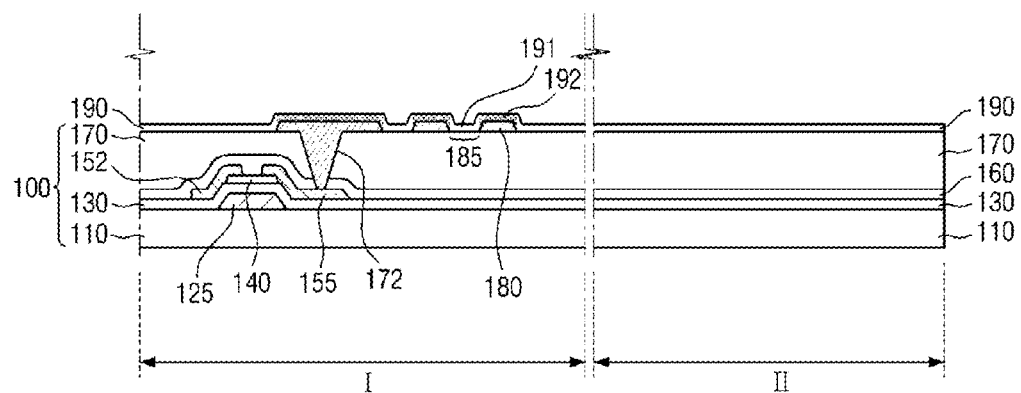

FIGS. 8 to 10 are cross-sectional views illustrating a manufacturing process of a liquid crystal display device according to one embodiment.

Referring to FIG. 8, the gate line GL, the gate electrode 125, the gate insulating layer 130, the semiconductor layer 140, the data line DL, the source electrode 152, the drain electrode 155, and the passivation film 160 are formed on the first substrate 110. Detailed methods for forming the above structures may be determined by one of skill in the art without undue experimentation, and thus a detailed description is omitted herein in order to avoid obscuring the present invention.

Subsequently, the organic layer 170 is formed on the passivation film 160. Then, the contact hole 172 is formed in the organic layer 170 and the passivation film 160.

A metal layer 180a is then formed on the organic layer 170.

Referring to FIG. 9, the pixel electrode 180 is formed by patterning the metal layer 180a. The pixel electrode 180 may be patterned to include the plurality of slits 185 defined therein and exposing the surface of the organic layer 170. The slits 185 may have a different pattern for each domain such that two or more domains can be formed in each pixel PX. Put another way, the pixel electrode may include two or more domains and each domain may have a different slit pattern Referring to FIG. 10, the first display substrate 100 is manufactured by forming the liquid crystal alignment film 190 on the pixel electrode 180. In the liquid crystal alignment film 190, the surface energy of the first region 191 covering the surface of the pixel electrode 180 and the surface energy of the second region 192 covering the surface of the organic layer 170 exposed by the slits 185 can be adjusted differently in order to control the alignment of the liquid crystal. Since this has been described above, a detailed description thereof is omitted.

Then, a sealant is formed on the edge side of the first display substrate 100, and the liquid crystal layer 300 is formed in a space surrounded by the sealant. Then, the second display substrate 200 is bonded to the first display substrate 100 through the sealant, and the sealing member 310 (see FIG. 2) is formed by curing the sealant, thereby manufacturing the liquid crystal display device 10. Then, an assembling process for completing a liquid crystal display module can be further performed.

However, the method of forming the liquid crystal layer 300 may be variously changed.

In the manufacturing method of the liquid crystal display device of the present invention, since the alignment of the liquid crystal molecules in the liquid crystal layer can be controlled by adjusting the surface energy of the surfaces adjacent to where the liquid crystal molecules is disposed, a process of adjusting the initial alignment of the liquid crystal by a method such as a photo alignment method, which includes injecting a reactive mesogen into a liquid crystal layer and curing the liquid crystal layer through ultraviolet light exposure can be omitted.

As one embodiment for forming the liquid crystal alignment film 190, a self-assembled monolayer may be formed on the pixel electrode 180.

Specifically, a self-assembly precursor material is coated on the exposed surface of the organic layer 170 and the pixel electrode 180. In this case, the density at which the self-assembly monolayer is formed can be controlled by adjusting the reaction time of the self-assembly precursor material. The self-assembly precursor material reacts with functional groups on the surface of the organic layer 170 and the pixel electrode 180 to form a self-assembled monolayer on the pixel electrode 180. The self-assembly precursor material may include at least one of the compounds represented by Formulas A and B described above. Then, the unreacted self-assembly precursor material (i.e., material which does not react to form the self-assembled monolayer) is removed.

Hereinafter, an experimental example for supporting the principle of controlling the initial alignment of the liquid crystal through the liquid crystal display device according to the embodiments of the present invention will be described in detail.

Preparation of Sample of Liquid Crystal Display Device

A liquid crystal display device (hereinafter, referred to as a sample) including minimum structures capable of controlling the alignment of the liquid crystal was prepared as follows.

First, a pattern was formed on a glass substrate by using indium tin oxide (ITO). The pattern was formed to have a structure shown in FIG. 3 and to be divided into four domains. Each branch electrode was formed to have a width of about 2 micrometer (μm). Then, octadecyltrichlorosilane, which is a self-assembly precursor material, was coated on the surface of the ITO substrate and the glass substrate, and was subject to reaction for a predetermined period of time to form a self-assembled monolayer. Then, any unreacted self-assembly precursor material was removed by washing the glass substrate and ITO substrate. In this case, the reaction time of the precursor material was varied for each sample.

Then, a liquid crystal composition was injected between the glass substrate and the ITO substrate to form a liquid crystal layer, and a backlight device was disposed below the glass substrate to complete samples of liquid crystal display devices.

Luminance Measurement and Surface Observation of Samples

Figure 11:
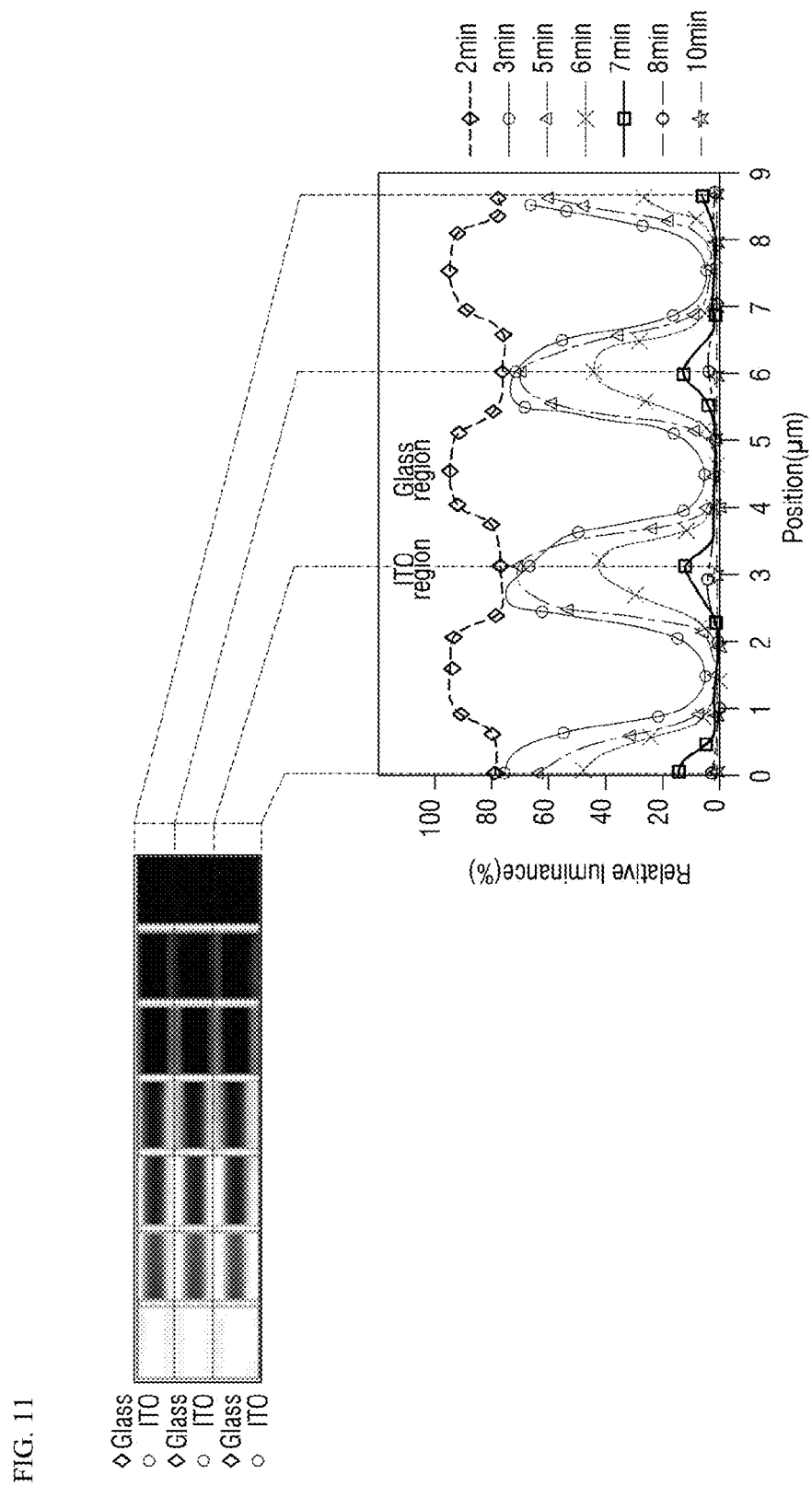
FIG. 11 is a graph of relative luminescence (percent, %) versus position (micrometers (μm), showing the results of measuring the relative luminance for each position where the surfaces of the indium tin oxide (ITO) and the glass substrate alternately appear, for samples prepared by varying the reaction time.

FIG. 11 is a graph showing results of measuring the relative luminance for each position where the surfaces of the ITO and the glass substrate alternately appear, for each sample prepared by varying the reaction time.

Figure 12:
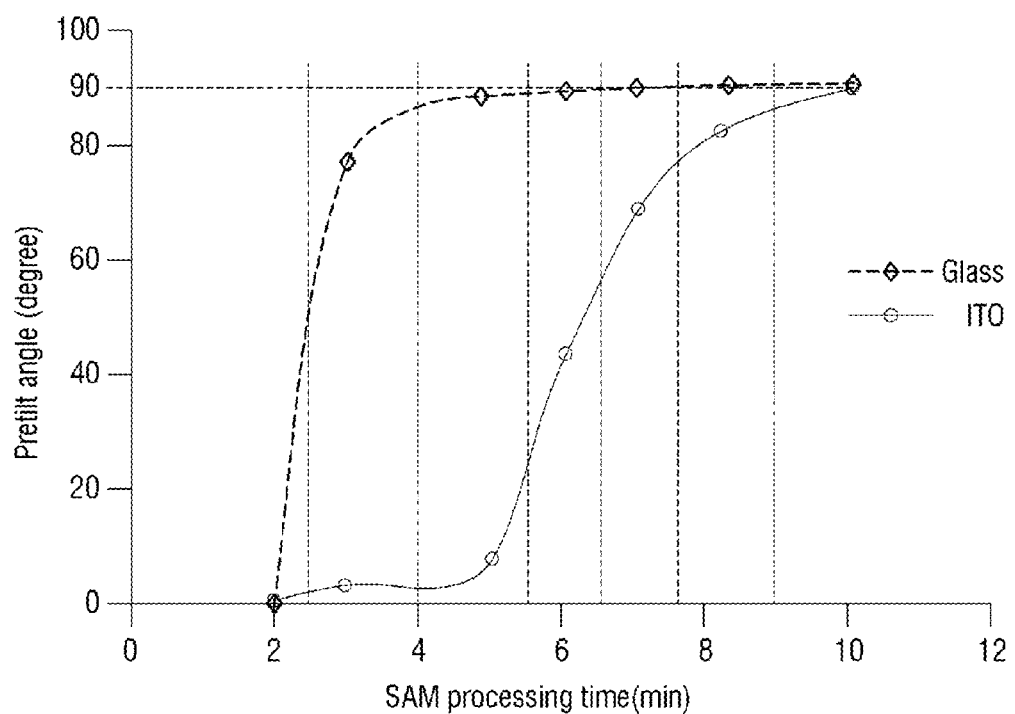
FIG. 12 is a graph of pretilt angle (degree) versus self-assembled monolayer (SAM) processing time (minutes, min), which shows the results of average pretilt angle of the liquid crystal molecules with reaction time of the self-assembled monolayer when formed on the surface of the glass substrate and the ITO substrate.

FIG. 12 shows the results of calculating an average pretilt angle of the liquid crystal molecules on the self-assembled monolayer formed on each of the surfaces of the glass substrate and the ITO substrate of each sample, based on the results of FIG. 11.

Figure 13:
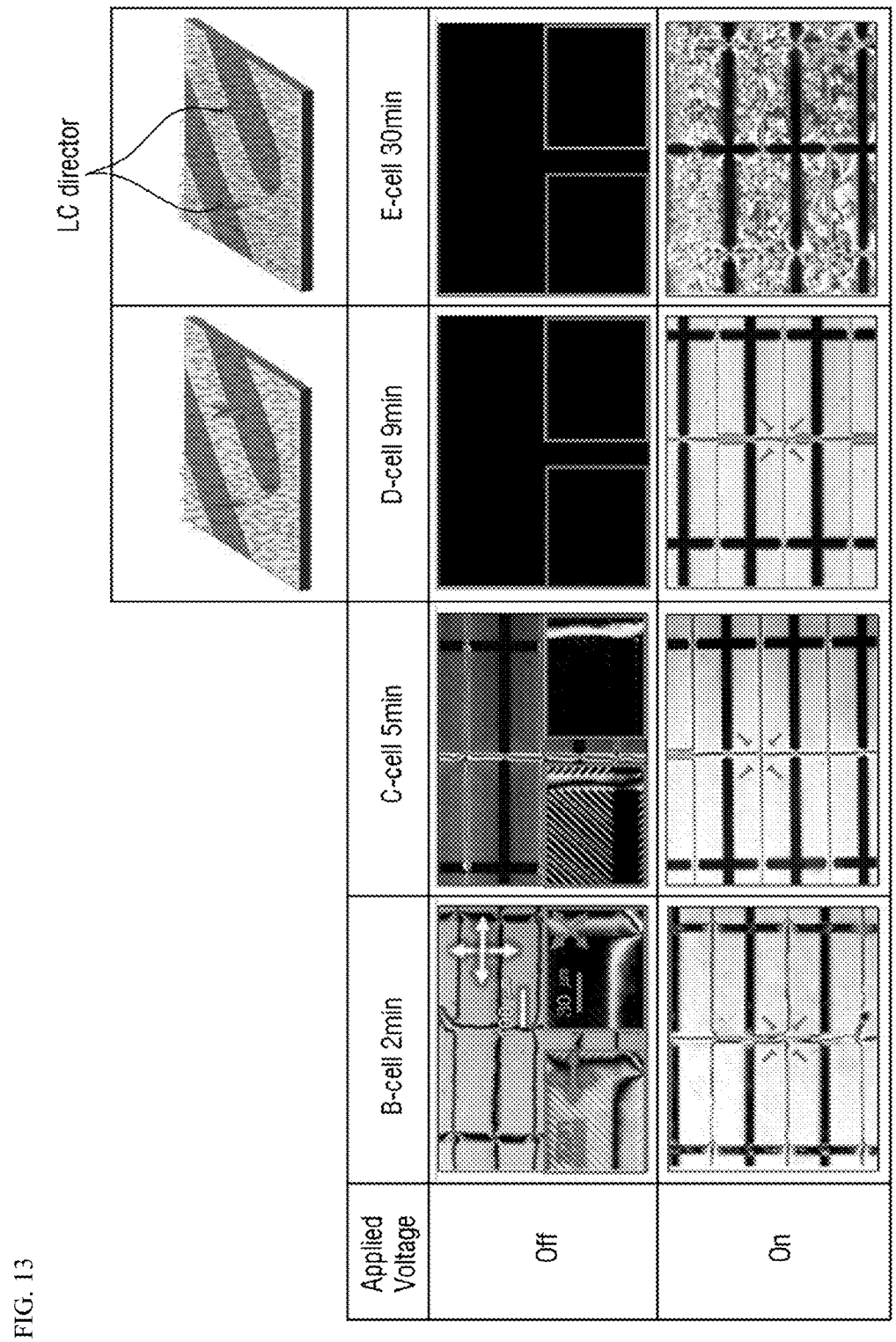
FIG. 13 shows results of observing the surfaces of samples prepared by setting the reaction times to 2, 5, 9, and 30 minutes.

FIG. 13 shows the results from observing the surfaces of samples prepared by setting the reaction times to 2, 5, 9, and 30 minutes.

Referring to FIGS. 11 to 13, the concentration or density of the self-assembled monolayer increases as the reaction time increases. Since the self-assembled monolayer is formed at different speeds on the surface of the glass substrate and the ITO substrate, it can be seen that the alignment of the liquid crystal molecules can be controlled by changing the surface energy where the liquid crystal molecules are located by adjusting the amount of time used to from the self-assembled monolayer.

In the case of a display device in a vertical alignment (VA) mode, if the process time is adjusted such that the liquid crystal is initially aligned, as in the case where the reaction time is set to 9 minutes in FIG. 13, the initial alignment of the liquid crystal can be set without performing a separate liquid crystal alignment process.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display device comprising:
a first substrate;
an organic layer disposed on the first substrate;
a pixel electrode disposed on the organic layer;
a plurality of slit defined in the pixel electrode and configured to expose a surface of the organic layer;
a liquid crystal alignment film disposed on a surface of the pixel electrode and on the surface of the organic layer exposed by the plurality of slits; and
a plurality of liquid crystal molecules disposed on the liquid crystal alignment film,
wherein the liquid crystal alignment film comprises a first region overlapping the plurality of slits and a second region overlapping the pixel electrode, and wherein the second region has a surface energy different from a surface energy of the first region.

2. The liquid crystal display device of claim 1, wherein a portion of the liquid crystal molecules are disposed on the first region and a portion of the liquid crystal molecules are disposed on the second region, wherein an average alignment direction of the portion of the liquid crystal molecules on the first region and an average alignment direction of the portion of the liquid crystal molecules on the second region are at different angles with respect to a surface of the liquid crystal alignment film.

3. The liquid crystal display device of claim 1, wherein a portion of the liquid crystal molecules are disposed on the first region, and an alignment direction of the portion of the liquid crystal molecules on the first region is perpendicular to a surface of the liquid crystal alignment film.

4. The liquid crystal display device of claim 1, wherein the liquid crystal alignment film comprises a self-assembled monolayer.

5. The liquid crystal display device of claim 1, wherein a portion of the liquid crystal molecules comprises a first alignment angle and a portion of the liquid crystal molecules comprise a second alignment angle having a same angle with respect to the surface of the liquid crystal alignment film as the first alignment angle, wherein an angle of 180 degrees with respect to a plane of the liquid crystal alignment film is present between the first alignment angle and the second alignment angle.

6. The liquid crystal display device of claim 5, wherein the portion of the liquid crystal molecules comprising the first alignment angle and the portion of the liquid crystal molecules comprising the second alignment angle are each located on the second region.

7. The liquid crystal display device of claim 1, wherein the pixel electrode comprises two or more domains and each domain comprises a different slit pattern.

8. The liquid crystal display device of claim 7, wherein an average alignment direction of the liquid crystal molecules located on the second region is different for each of the two or more domains.

9. A liquid crystal display device comprising:
a first substrate;
an organic layer disposed on the first substrate;

a pixel electrode disposed on a portion of the organic layer;

a self-assembled monolayer disposed on the pixel electrode and on a portion of the organic layer on which the pixel electrode is not disposed; and a plurality of liquid crystal molecules disposed on the self-assembled monolayer, wherein the self-assembled monolayer comprises a first region overlapping the portion of the organic layer on which the pixel electrode is not disposed and a second region overlapping the pixel electrode and having a density which is different from a density of the first region.

10. The liquid crystal display device of claim 9, wherein the self-assembly monolayer comprises an octadecyltrichlorosilane derivative.

11. The liquid crystal display device of claim 9, wherein a portion of the liquid crystal molecules are disposed on the first region and a portion of the liquid crystal molecules are disposed on the second region, and an average alignment direction of the portion of the liquid crystal molecules on the first region and an average alignment direction of the portion of the liquid crystal molecules on the second region are at different angles with respect to a surface of the self-assembled monolayer.

12. The liquid crystal display device of claim 9, wherein a portion of the liquid crystal molecules are disposed on the first region, and an alignment direction of the portion of the liquid crystal molecules on the first region is perpendicular to a surface of the self-assembled monolayer.

13. The liquid crystal display device of claim 9, wherein a portion of the liquid crystal molecules comprises a first alignment angle and portion of the liquid crystal molecules comprises a second alignment angle having a same angle with respect to a surface of the self-assembled monolayer as the first alignment, wherein an angle of 180 degrees with respect to a plane of the self-assembled monolayer is present between the first alignment angle and the second alignment angle.

14. The liquid crystal display device of claim 13, wherein the liquid crystal molecules having the first alignment and the second alignment are located on the second region.

* * * * *